May 22, 1928. 1,670,438
G. B. COLEMAN
TRANSMISSION
Filed June 28, 1926
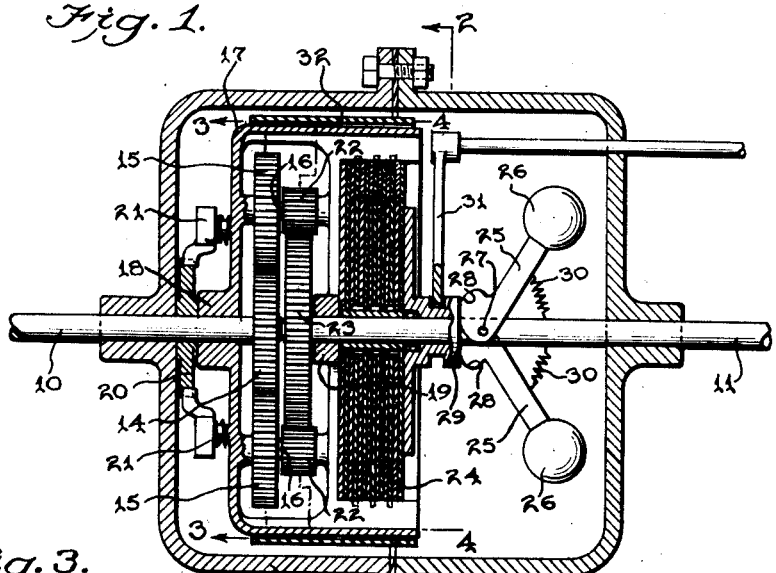
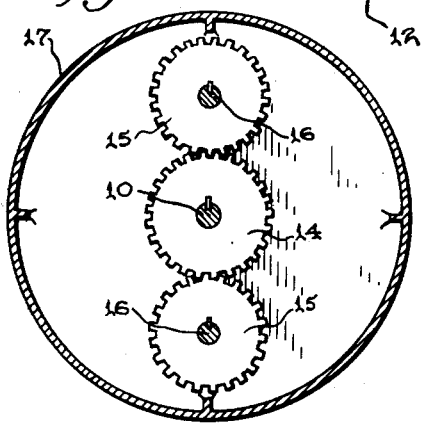
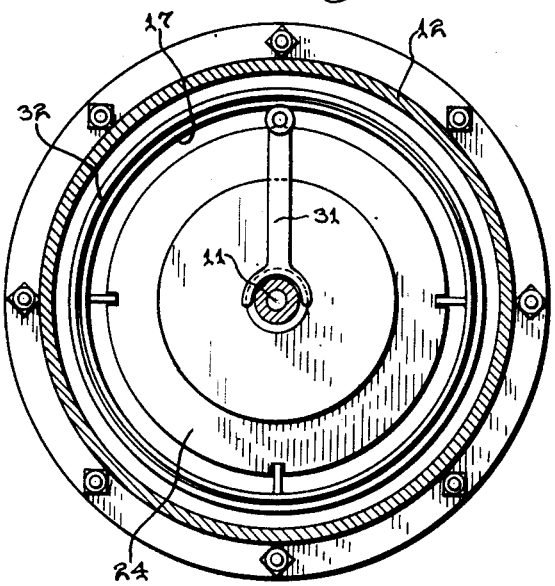
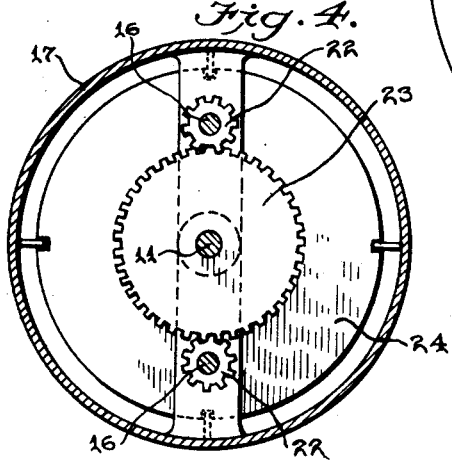
INVENTOR.
George B. Coleman
BY
ATTORNEY.

Patented May 22, 1928.

1,670,438

UNITED STATES PATENT OFFICE.

GEORGE B. COLEMAN, OF PHILADELPHIA, PENNSYLVANIA, ASSIGNOR TO COLEMAN AUTOMATIC TRANSMISSION COMPANY, A CORPORATION OF CALIFORNIA.

TRANSMISSION.

Application filed June 28, 1926. Serial No. 119,107.

The object of the invention is to provide a transmission of the planetary gear type in which, after the load has been accelerated to the driver speed, the planet carrier may be effectively locked to rotate in synchronism with the driver; to provide a centrifugal governor for locking the planet carrier in high and actuated by the driven member; and to provide an independent means for arresting the movement of the planet carrier so that braking action, through a gear reduction, may be secured from the driver.

With this object in view, the invention consists in a construction and combination of parts of which a preferred embodiment is illustrated in the accompanying drawings, wherein:

Figure 1 is a central vertical sectional view of the invention.

Figures 2, 3 and 4 are respectively sectional views on the planes indicated by the lines 2—2, 3—3 and 4—4 of Figure 1.

The driving and driven shafts 10 and 11 are designed respectively for connection to the prime mover and the load, such as the motor and propeller shaft of an auto vehicle engine. They are journaled in the forward and rear ends of the casing 12, being axially aligned, and on the rear end of the former there is carried the gear 14 which meshes with the planetary gears 15 mounted on shafts 16 disposed in the planet carrier 17. The planet carrier is floatingly supported by the driver and driven member having the hubs 18 and 19 rotatably mounted on the two.

To permit rotary movement of the carrier forward but to preclude its retrograde movement, a ratchet wheel 20 is disposed within and mounted upon the front wall of the casing and its peripheral surface is traversed by pawls 21 carried by the carrier.

Fixed with reference to the gears 15 are the pinions 22, these pinions meshing with a gear 23 carried at the forward end of the driven member 11.

The carrier on the rear face is recessed or pocketed for the reception of a multiple disk clutch 24 which is keyed to the driven member for sliding movement axially of the latter. The clutch, however, does not function until the driven member shall have attained a predetermined speed, when the clutch is actuated to connect the carrier with the driven member. This automatic clutch actuating means consists of the levers 25 terminally weighted, as indicated at 26, and pivoted at their inner ends, as indicated at 27, on diametrically opposite sides of the driver, having cam elements 28 adjacent the pivots engaging the ends of the clutch thimble 29.

Springs 30 tensioned between the levers and the driven member tend to draw the latter inwardly toward the driven member and it is only after the latter has been accelerated to a certain speed that the weights 26 function to extend the springs 30 and actuate the cams 28 to engage the clutch. Prior to such operation, however, the driven member runs at a speed below the driver due to the gear reduction represented by the gears 14, 15, 22 and 23. The positive movement forward of the driver, however, is provided because of the fact that retrograde movement of the carrier 17 is precluded by means of the pawls 21 and ratchet wheel 20. These pawls, however, interpose no interference to the movement of the driver forwardly, as when it is engaged by the clutch 24, when the gear train becomes a locked mechanism and synchronous movement between the driver and driven member takes place.

In addition to the automatic clutch actuating means, there is provided an additional actuating means for either hand or foot control, this comprising a fork 31 engaging the thimble 29 of the clutch.

Since in auto vehicular use, it is essential that means be provided to secure braking action through the driving motor, a contractile band 32 is disposed in surrounding relation to the carrier 17. This band may be actuated by either a foot or hand controlled element and, when contracted to engage the carrier 17, the carrier is held stationary. This operation must, of course, be attended with a disengagement of the clutch 24 and, if the load has not been retarded enough to permit such disengagement by the movement inwardly of the levers 25, the fork 31 may be actuated to release the clutch. In the braking operation, the turning force is transmitted through the driven member and the gear train at this time functioning, there will be a tendency to accelerate the driver. But the gear ratio under these conditions is ascending and consequently there will be the usual effective braking operation through the prime mover connected to the driver.

The invention having been described, what is claimed as new and useful is:

1. A transmission comprising driving and driven members, a planet carrier in surrounding relation to said members at their adjacent ends and floatingly supported by the two, a gear train of descending ratio of which the terminal units are carried respectively by the driving and driven members and the intermediate units by the planet carrier, means to preclude retrograde movement of the planet carrier but permit forward movement of the same, the carrier being formed with a pocket on the rear face, a multiple disk clutch disposed in said pocket and operatively connected respectively with the carrier and the driven member, and centrifugal means carried by the driven member and operatively connected with said clutch for effecting driving engagement with the elements thereof.

2. A transmission comprising driving and driven members, a planet carrier in surrounding relation to said members at their adjacent ends and floatingly supported by the two, a gear train of descending ratio of which the terminal units are carried respectively by the driving and driven members and the intermediate units by the planet carrier, means to preclude retrograde movement of the planet carrier but permit forward movement of the same, the carrier being formed with a pocket on the rear race, a multiple disk clutch disposed in said pocket and operatively connected respectively with the carrier and the driven member, said clutch having a thimble, levers pivotally mounted on the driven member and provided with weights at their free ends and at their other ends having cam elements bearing on said thimble to effect driving engagement with the clutch elements upon outward swinging movement of the levers.

3. A transmission comprising driving and driven members, a planet carrier in surrounding relation to said members at their adjacent ends and floatingly supported by the two, a gear train of descending ratio of which the terminal units are carried respectively by the driving and driven members and the intermediate units by the planet carrier, means to preclude retrograde movement of the planet carrier but permit forward movement of the same, the carrier being formed with a pocket on the rear face, a multiple disk clutch disposed in said pocket and operatively connected respectively with the carrier and the driven member, said clutch having a thimble, levers pivotally mounted on the driven member and provided with weights at their free ends and at their other ends having cam elements bearing on said thimble to effect driving engagement with the clutch elements upon outward swinging movement of the levers, a diametrically contractible member surrounding the carrier for engagement with and arresting movement of the same, and a manually actuable member engageable with said clutch thimble for control of the clutch in opposition to said centrifugally operated levers.

In testimony whereof he affixes his signature.

GEORGE B. COLEMAN.